Feb. 27, 1934.　　　　R. H. PRICE　　　　1,948,732
HYDROGENATION SYSTEM
Filed May 30, 1930
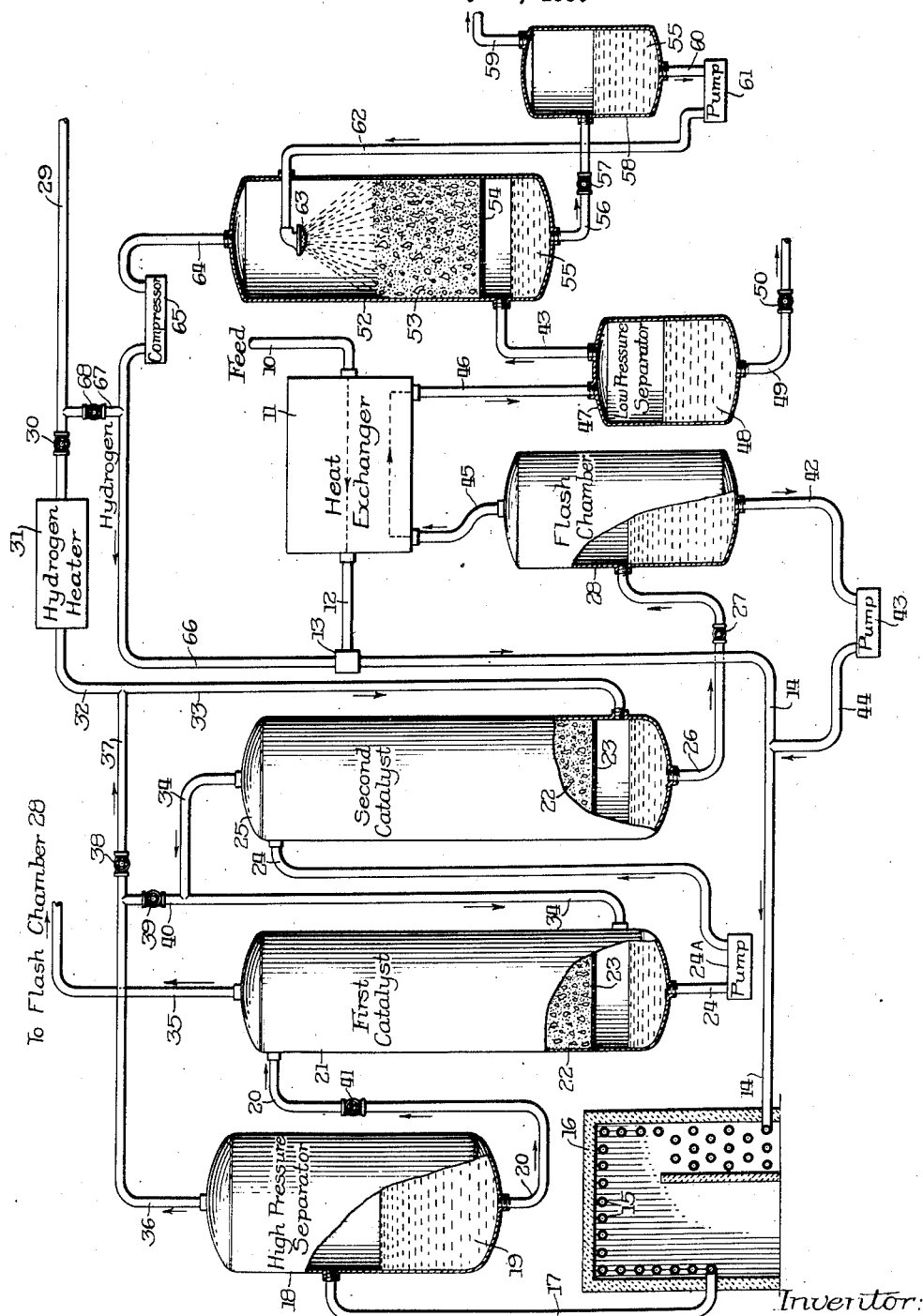
Inventor:
Ralph H. Price.
By Bruce K. Brown atty.

Patented Feb. 27, 1934

1,948,732

UNITED STATES PATENT OFFICE 1,948,732

HYDROGENATION SYSTEM

Ralph H. Price, Hammond, Ind., assignor to Standard Oil Company (Indiana), Chicago, Ill., a corporation of Indiana Application May 30, 1930. Serial No. 457,613

4 Claims. (Cl. 196—53)

This invention relates to the hydrogenation of petroleum oils and it pertains more particularly to the production of gasoline from heavier hydrocarbons.

The object of my invention is to provide a system wherein the maximum concentration of pure hydrogen is contacted with the oil which is most nearly hydrogenated and wherein the flow of hydrogen is counter current to the flow of hot oil both in the several catalyst chambers and in the system as a whole.

A further object is to effect hydrogenation in the liquid phase in an improved manner whereby more effective contact is obtained between catalyst, liquid, and hydrogen.

A further object is to separate and recycle heavy non-hydrogenated fractions, and to obtain increased heat efficiency and decreased operating costs.

In my system I heat the oil with a part of the hydrogen, separate the hot liquids from gases and pass these liquids and gases counter currently through a catalyst chamber, the liquid being trickled in a thin film over the catalyst. I use a countercurrent hydrogen-liquid flow in each catalyst chamber and throughout the system. I then flash the hydrogenated liquid at a lower pressure, recycle this liquid, and separate the hydrogenated oils and other gases from the gases and vapors leaving the flash chamber.

My invention will be more clearly understood from the following description and the accompanying drawing wherein I have diagrammatically shown an elevation of my improved system.

Feed stock is introduced by pipe 10 at about 250 atmospheres pressure and is passed through heat exchanger 11, pipe 12, mixer 13, and pipe 14 to the heating coils 15 of pipe still 16. The hot fluid mixture from the pipe still is introduced by pipe 17 into high pressure separator 18, the liquid 19 being withdrawn from the base of the separator by pipe 20 and introduced into the top of the first catalyst chamber 21. This catalyst chamber is provided with a suitable catalyst material 22 which may be mounted on suitable trays or screens 23. The catalyst may be granulated or in lumps, or it may be incorporated in a carrier such as fuller's earth. The liquid, which is introduced by pipe 20, will trickle down over the catalyst in chamber 21 countercurrent to an upward flow of hydrogen and will thereby expose the hot oil in thin films to the hydrogen. I contemplate the use, of course, of suitable sprays and distributing means for effecting a uniform flow of liquid and gas throughout all parts of the catalyst.

The liquid from the base of catalyst chamber 21 is withdrawn by pipe 24, subjected to increased pressure by pump 24A and introduced at the top of a second catalyst chamber 25 where it trickles over a catalyst material 22 supported by screen or perforated plates 23. I may use any suitable catalyst for this reaction and I may use a different catalyst in the different chambers as will be apparent to those skilled in the art. The liquid which is trickled over the catalyst in the second chamber is withdrawn from the base of said chamber 25 by pipe 26, it is passed through reducing valve 27 and is then introduced into flash chamber 28 where the low boiling compounds, such as gasoline, are removed.

Fresh hydrogen is introduced from high pressure line 29 (about 250 atmospheres) through valve 30, heater 31 and pipes 32 and 33 to the base of the second catalyst chamber 25. The hot hydrogen passes countercurrent to the partially hydrogenated oil as it trickles in thin films over the catalyst. The hydrogen and gases leaving the top of catalyst chamber 25 are conducted by pipe 34 to the base of the first catalyst chamber 21 where the hydrogen passes countercurrent to the incoming oil.

The hydrogen leaving the first catalyst chamber is conducted by pipe 35 to flash chamber 28, or to a means for separating the hydrogen from other gases.

A considerable amount of hydrogen may separate from the liquid in high pressure separator 18. This hydrogen may be conducted through pipes 36 and 37 to pipe 33, where it may be mixed with the fresh heated hydrogen from pipe 32. Since it may be desirable to use a high concentration of fresh hydrogen in the last catalyst chamber I may, by closing valve 38 and opening valve 39, direct the hydrogen from pipe 36 through pipe 40 to pipe 34 and thereby pass the partially spent hydrogen countercurrent to the oil in the first catalyst chamber. In order to avoid pumping hydrogen at reaction temperature, I reduce the pressure of the liquid which is supplied to the first catalyst chamber by a reducing valve 41 in pipe 20. The pressure in the high pressure separator is sufficient to force the hydrogen into the second catalyst chamber 25.

The liquid in flash chamber 28 is withdrawn by pipe 42 and pumped by pressure pump 43 through pipe 44 into pipe 14, where it is mixed with charging stock about to enter the preheater. The gases and vapors from flash chamber 28 are conducted by pipe 45 through heat exchanger 11 and pipe 46 to low pressure separator 47, the condensed liquid 48 being removed through pipe 49 and valve 50.

Gases from separator 47 are conducted by pipe 51 to scrubber 52, which may be filled with suitable packing material 53 on a screen 54. The scrubbing liquid 55, which may be an absorbent non-volatile oil, is removed from the base of scrubber 52 through pipe 56 and reducing valve 57 into gas release tank 58, the methane, hydrogen sulfide and other gas impurities being discharged therefrom through pipe 59. The liquid in the base of release tank 58 is withdrawn by pipe 60 and circulated by pump 61 through pipe 62 and discharge nozzle 63 which sprays this liquid countercurrent to the upward flow of hydrogen in the scrubber.

Pure hydrogen leaves the scrubber at pipe 64 and is compressed by compressor 65 to a pressure of about 250 atmospheres, the compressed gases being introduced by pipe 66 into mixer 13, where it meets the fresh charging stock from pipe 12. In addition to recycle hydrogen I may introduce make-up hydrogen through bypass 67 in amounts regulated by valve 68.

In this example I have shown only two catalyst chambers, but this showing is only for simplicity of illustration. Any number of catalyst chambers may be used to effect the desired hydrogenation. I may use various catalysts, although the particular catalyst used forms no part of my invention. Particularly useful catalysts are those comprising sulfur-resistant irreducible oxides of metals of the sixth group, with or without the addition of oxides of metals of other groups. For example, I may use molybdenum oxide or a mixture of molybdenum oxide with smaller proportions of manganese and/or zinc oxide.

The operation of my invention may be described as follows: The feed stock is passed through the heat exchanger 11 and is then mixed with hydrogen from line 66 in mixer 13. This mixture then passes through the heater where its temperature is raised to about 850 to 900° F. the mixture being maintained in the heater for an insufficient time to produce a large degree of cracking. The hot mixture is separated in high pressure separator 18 and the hydrogen is passed countercurrent to the liquid through the catalyst chambers and through the system. This is an important feature of my invention because the hottest and most concentrated hydrogen is contacted with the oil which is most nearly saturated. By increasing the pressure in the successive catalyst chambers I effect more efficient hydrogenation and I avoid the use of hydrogen compressors between the stages.

The liquid leaving chamber 25 through pipe 26 is released into flash chamber 28, the non-hydrogenated liquid being recycled, the hydrogenated product being condensed and removed, and the hydrogen which was released in flash chamber 28 being scrubbed and introduced back into the system. Where the term "destructive hydrogenation" is used in the claims hereof, it will be understood that this refers to processes wherein liquid carbonaceous materials, or solid carbonaceous materials in suspension in liquid carbonaceous materials, are treated with hydrogen at temperatures above 750° F. and pressures above 100 atmospheres, the conditions and duration of treatment being such as to produce changes in the boiling range and/or composition of the materials present more far-reaching than those produced by simple saturation of unsaturated carbon linkages.

While I have described in detail the preferred embodiment of my invention, it is understood that I do not limit myself to these details except as defined by the following claims.

I claim:

1. In a system for destructively hydrogenating oils, means for heating a mixture of oil and hydrogen, a plurality of chambers for contacting said hot mixture with a catalyst, means including a flash separator for separating and recycling non-hydrogenated fractions of said oil, and means for introducing hydrogen from the first chamber and oil from the last chamber into said separator.

2. In a hydrogenation system, a plurality of catalyst chambers, a heater, a high pressure separator, means for introducing liquid from said heater to said separator, from the separator to the top of a catalyst chamber, and from the bottom of the catalyst chamber to the top of a second catalyst chamber, means for introducing hydrogen at the base of the second chamber, and for conducting it from the top thereof to the base of the first named chamber, and means for introducing gas from said separator to the base of at least one of said chambers.

3. The method of destructive hydrogenation which comprises heating a mixture of oil and hydrogen to about 850° F. in a narrow elongated heating zone, separating the hot oil and hydrogen in an enlarged zone, and contacting said oil with hydrogen in a plurality of catalyst chambers arranged in series, wherein the hydrogen flows countercurrently with the oil in each catalyst chamber, and also in the system as a whole, the pressure on the system being about 200 atmospheres.

4. The method of destructive hydrogenation which comprises heating a mixture of oil and hydrogen to a temperature of about 850° F. under a pressure of about 200 atmospheres, separating the hot oil from the hydrogen, passing the hot oil through a plurality of catalyst chambers in series wherein it is contacted with hydrogen flowing countercurrently in each chamber and also in the series of chambers, and introducing the hydrogen originally separated from the hot oil at the base of one of said chambers.

RALPH H. PRICE.